US009491775B2

(12) United States Patent
Nagata et al.

(10) Patent No.: US 9,491,775 B2
(45) Date of Patent: Nov. 8, 2016

(54) BASE STATION APPARATUS, MOBILE TERMINAL APPARATUS, AND INFORMATION TRANSMISSION METHOD

(75) Inventors: Satoshi Nagata, Yokosuka (JP);
Kazuaki Takeda, Kanagawa (JP);
Nobuhiko Miki, Yokohama (JP);
Yoshihisa Kishiyama, Yokosuka (JP);
Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 1399 days.

(21) Appl. No.: 13/143,376

(22) PCT Filed: Jan. 6, 2010

(86) PCT No.: PCT/JP2010/050042
§ 371 (c)(1),
(2), (4) Date: Sep. 14, 2011

(87) PCT Pub. No.: WO2010/079785
PCT Pub. Date: Jul. 15, 2010

(65) Prior Publication Data
US 2012/0039267 A1 Feb. 16, 2012

(30) Foreign Application Priority Data
Jan. 7, 2009 (JP) .................. 2009-002061

(51) Int. Cl.
H04W 72/12 (2009.01)
H04L 5/00 (2006.01)

(52) U.S. Cl.
CPC .......... H04W 72/1231 (2013.01); H04L 5/003 (2013.01); H04L 5/006 (2013.01); H04L 5/0023 (2013.01); H04L 5/0039 (2013.01); H04L 5/0041 (2013.01); H04W 72/1273 (2013.01); H04W 72/1289 (2013.01)

(58) Field of Classification Search
CPC ... H04L 5/0023; H04L 5/003; H04L 5/0039; H04L 5/0041; H04L 5/006; H04W 72/1231; H04W 72/1273; H04W 72/1289
USPC ........................................... 370/329
See application file for complete search history.

(56) References Cited

U.S. PATENT DOCUMENTS

2006/0014554 A1* 1/2006 Gerlach .................. 455/501
2008/0207135 A1* 8/2008 Varadarajan et al. .......... 455/69
(Continued)

FOREIGN PATENT DOCUMENTS

JP 2004-529524 A 9/2004

OTHER PUBLICATIONS

NEC Group. R1-083491. 3GPP TSG-RAN WG1#54Bis, Prague, Czech Republic. Sep. 29-Oct. 3, 2008.*
(Continued)

Primary Examiner — Stephen J Clawson
(74) Attorney, Agent, or Firm — Osha Liang LLP

(57) ABSTRACT

To improve the frequency diversity effect and enhance reception quality characteristics in a mobile terminal apparatus even when the system bandwidth is extended, provided are a base station apparatus which maps transmission data to each user to a single or plurality of group bands among group bands configured by dividing a system band into a plurality of bands, and transmits the mapped transmission data on downlink, and a mobile terminal apparatus which receives the transmission data mapped to the group bands and demaps the transmission data.

13 Claims, 14 Drawing Sheets

(56) References Cited

U.S. PATENT DOCUMENTS

| | | | |
|---|---|---|---|
| 2009/0067329 A1* | 3/2009 | Sumasu | H04W 72/085 370/232 |
| 2009/0086791 A1* | 4/2009 | Bienas et al. | 375/132 |
| 2009/0109905 A1* | 4/2009 | Ahmadi | 370/329 |
| 2009/0298523 A1* | 12/2009 | Ogawa | H04W 72/04 455/509 |

OTHER PUBLICATIONS

Qualcomm Europe. R1-080470. 3GPP TSG-RAN WG1#51bis, Sevilla, Spain. Jan. 14-18, 2008.*

Office Action for corresponding Japanese Application No. 2009-002061, mailed Sep. 17, 2013 (4 pages).

International Search Report w/translation from PCT/JP2010/050042 dated Apr. 13, 2010 (4 pages).

TSG-RAN WG1#54Bis, R1-083491; "Downlink Control Structure for Carrier Aggregation Approach in LTE-Advanced System"; NEC Group; Prague, Czech Republic; Sep. 29-Oct. 3, 2008 (4 pages).

3GPP TS 36.213 V8.4.0; "3rd Generation Partnership Project; Technical Specification Group Radio Access Network; Evolved Universal Terrestrial Radio Access (E-UTRA); Physical Layer Procedures (Release 8)"; Sep. 2008 (60 pages).

3GPP TS 36.211 V8.4.0; "3rd Generation Partnership Project; Technical Specification Group Radio Access Network; Evolved Universal Terrestrial Radio Access (E-UTRA); Physical Channels and Modulation (Release 8)"; Sep. 2008 (78 pages).

3GPP TS 36.212 V8.4.0; "3rd Generation Partnership Project; Technical Specification Group Radio Access Network; Evolved Universal Terrestrial Radio Access (E-UTRA); Multiplexing and Channel Coding (Release 8)"; Sep. 2008 (56 pages).

Notification of Reasons for Rejection for Japanese Application No. 2009-002061 dated Feb. 19, 2013, with English translation thereof (8 pages).

3GPP TSG RAN WG1 Meeting #55, R1-084245, "Transport Block Mapping for Wider Bandwidth in LTE-Advanced," NTT Docomo, Inc.; Prague, Czech Republic, Nov. 10-14, 2008 (8 pages).

* cited by examiner (a)

| | | SYSTEM BAND | | | | | | | |
|---|---|---|---|---|---|---|---|---|---|
| | | 1.4MHz | | 5MHz | | 10MHz | | 20MHz | |
| | | THE NUMBER OF TB | BS (THE NUMBER OF BITS) | THE NUMBER OF TB | BS (THE NUMBER OF BITS) | THE NUMBER OF TB | BS (THE NUMBER OF BITS) | THE NUMBER OF TB | BS (THE NUMBER OF BITS) |
| LAYER | 1 | 1 | 75000 | 1 | 75000 | 1 | 75000 | 1 | 75000 |
| | 2 | 2 | 75000 | 2 | 75000 | 2 | 75000 | 2 | 75000 |
| | 4 | 2 | 150000 | 2 | 150000 | 2 | 150000 | 2 | 150000 |

BASE STATION APPARATUS, MOBILE TERMINAL APPARATUS, AND INFORMATION TRANSMISSION METHOD

TECHNICAL FIELD

The present invention relates to a base station apparatus, mobile terminal apparatus, and information transmission method, and more particularly, to a base station apparatus, mobile terminal apparatus, and information transmission method using next-generation mobile communication techniques.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, the widest system band of 20 MHz in the LTE specification is scheduled to be extended to about 100 MHz.

Further, the LTE scheme system adopts multi-antenna radio transmission techniques such as the MIMO (Multiple Input Multiple Output) multiplexing method, and actualizes fast signal transmission by transmitting different transmission signals parallel from a plurality of transmitters using the same radio resources (frequency band, time slot) to spatially multiplex. In the LTE scheme system, it is possible to transmit different transmission signals parallel from four transmission antennas at the maximum to spatially multiplex. In LTE-A, the maximum number (four) of transmission antennas in the LTE specification is scheduled to be increased to eight.

In addition, in the LTE scheme system, when a transmission error occurs in an information bit, the receiver side makes a retransmission request, and in response to the retransmission request, the transmitter performs retransmission control. In this case, the number of blocks (hereinafter, referred to as "transport blocks") each of which is a retransmission unit in performing retransmission control is determined corresponding to the number of transmission antennas irrespective of the system bandwidth (for example, Non-patent Literatures 1 to 3). Described herein is the relationship in the LTE scheme between the system bandwidth and the number of transmission antennas, and the number of transport blocks (the number of TBs) and the transport block size (BS). FIG. 14 is a table showing the relationship in the LTE scheme system between the system bandwidth and the number of transmission antennas, and the number of transport blocks and the transport block size. In addition, FIG. 14 shows 1.4 MHz, 5 MHz, 10 MHz and 20 MHz as the system bandwidth. Further, the "layer" as shown in FIG. 14 corresponds to the number of transmission antennas.

As shown in FIG. 14, in the LTE scheme system, irrespective of the system bandwidth, a single transport block is set in the case of a single transmission antenna. Similarly, the number of transport blocks is set at two in the case that the number of transmission antennas is two, and also the number of transport blocks is set at two in the case that the number of transmission antennas is four. In other words, when the number of transmission antennas is two or more, the number of transport blocks is equally set at two.

CITATION LIST

Non-Patent Literature

[Non-patent Literature 1]
3GPP, TS 36.211 (V. 8.4.0), "Evolved Universal Terrestrial Radio Access (E-UTRA); Physical Channels and Modulation (Release 8)", September 2008
[Non-patent Literature 2]
3GPP, TS 36.212 (V. 8.4.0), "Evolved Universal Terrestrial Radio Access (E-UTRA); Multiplexing and channel coding (Release 8)", September 2008
[Non-patent Literature 3]
3GPP, TS 36.213 (V. 8.4.0), "Evolved Universal Terrestrial Radio Access (E-UTRA); Physical layer procedures (Release 8)", September 2008

SUMMARY OF INVENTION

Technical Problem

As described above, in LTE-A, it is scheduled that the maximum system bandwidth is extended to about 100 MHz, and that the maximum number of transmission antennas is increased to eight. However, any determinations are not made on the transmission method (including the retransmission method) of transmission data under circumstances where the system bandwidth is thus extended. For such a transmission method of transmission data, it is conceivable that the method is required to be determined in consideration of reception quality characteristics in mobile terminal apparatuses.

The invention was made in view of such circumstances, and it is an object of the invention to provide a base station apparatus, mobile terminal apparatus, and information transmission method for improving the frequency diversity effect and enabling reception quality characteristics in the mobile terminal apparatus to be enhanced.

Solution to Problem

A base station apparatus of the invention is characterized by having mapping section configured to map transmission data to a user to a single or plurality of group bands among group bands configured by dividing a system band into a plurality of bands, and transmitting section configured to transmit the transmission data mapped by the mapping means to a mobile terminal apparatus on downlink.

According to this configuration, the transmission data to a user is mapped to a single or plurality of group bands obtained by dividing the system band, and therefore, even when the system bandwidth is extended, it is possible to improve the frequency diversity effect and to enhance reception quality characteristics in the mobile terminal apparatus.

Further, when the transmission data is retransmitted, it is possible to suppress deterioration in retransmission efficiency caused by increases in the transport block size, and to retransmit the transmission data efficiently.

A mobile terminal apparatus of the invention is characterized by having receiving section configured to receive transmission data mapped to a single or plurality of group bands among group bands configured by dividing a system band into a plurality of bands, and demapping section configured to demap the transmission data received in the receiving means.

According to this configuration, the mobile terminal apparatus receives transmission data mapped to a single or plurality of group bands among group bands obtained by dividing the system band, and demaps the transmission data, and therefore, even when the system bandwidth is extended, it is possible to improve the frequency diversity effect and to enhance reception quality characteristics in the mobile terminal apparatus. Further, when the transmission data is retransmitted, it is possible to suppress deterioration in retransmission efficiency caused by increases in the transport block size, and to retransmit the transmission data efficiently.

Technical Advantage of the Invention

According to the invention, the transmission data to a user is mapped to a single or plurality of group bands obtained by dividing the system band, and therefore, even when the system bandwidth is extended, it is possible to improve the frequency diversity effect and to enhance reception quality characteristics in the mobile terminal apparatus. Further, when the transmission data is retransmitted, it is possible to suppress deterioration in retransmission efficiency caused by increases in the transport block size, and to retransmit the transmission data efficiently.

BRIEF DESCRIPTION OF DRAWINGS

FIG. 14 is a table showing the relationship between the system bandwidth and the number of transmission antennas, and the number of transport blocks and transport block size in an LTE scheme system.

DESCRIPTION OF EMBODIMENTS

An Embodiment of the invention will specifically be described below with reference to accompanying drawings. In addition, the following description is given using an LTE-A (LTE Advanced) scheme system as an example of a wideband radio access scheme that is a successor to LTE, but the invention is not limited thereto.

Figure 1:
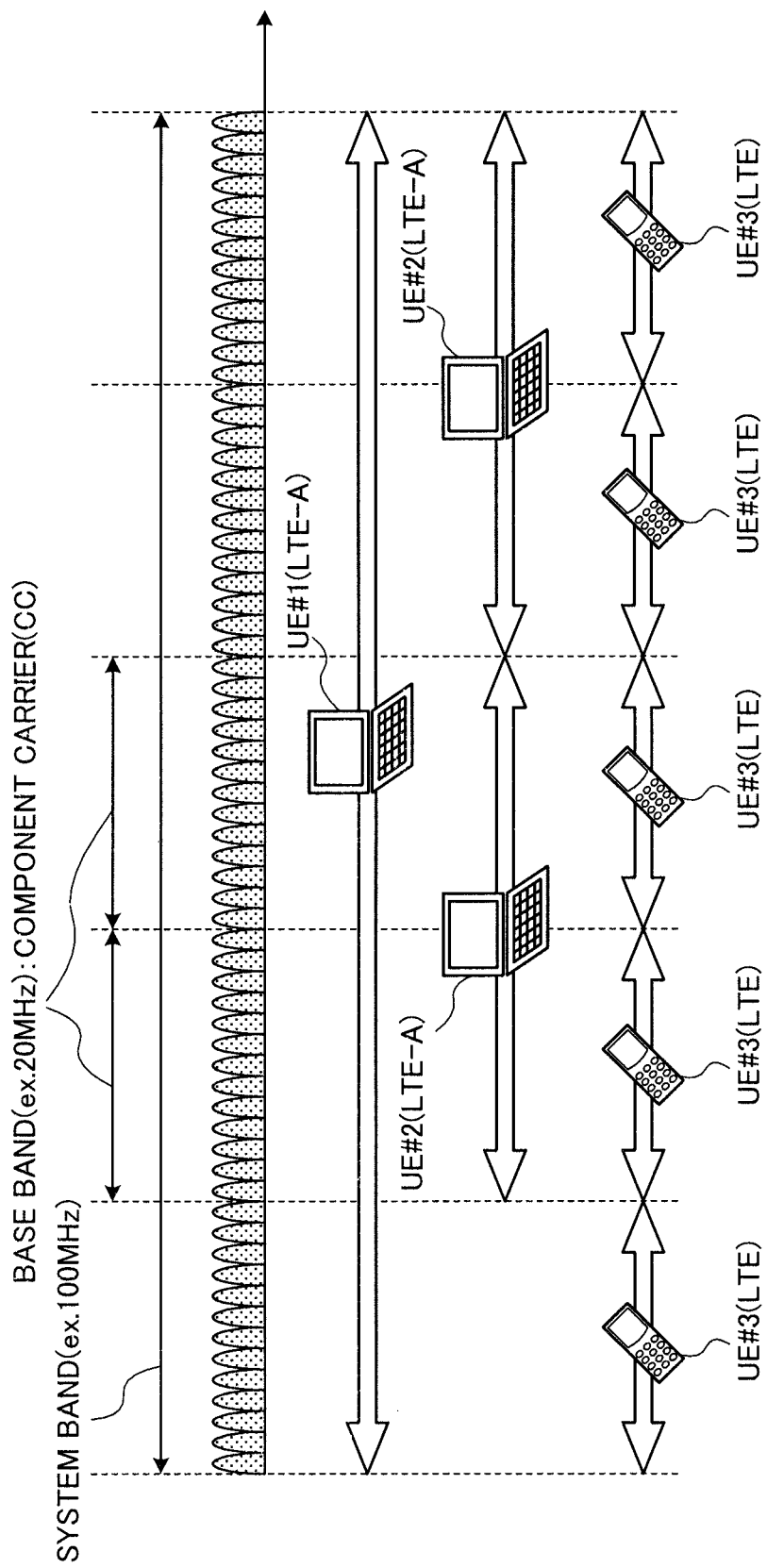
FIG. 1 is a diagram to explain the frequency usage state when mobile communication is performed in downlink.

FIG. 1 is a diagram to explain the frequency usage state when mobile communication is performed in downlink. FIG. 1 shows the frequency usage state in the case of coexistence of an LTE-A system that is a mobile communication system having a system band comprised of a plurality of component carriers, and an LTE system that is a mobile communication system having a system band comprised of a single component carrier. For example, in the LTE-A system, radio communication is performed in a variable system bandwidth of 100 MHz or less, and in the LTE system, radio communication is performed in a variable system bandwidth of 20 MHz or less. The system band of the LTE-A system is at least one base frequency region (component carrier: CC) with a system band of the LTE system as a unit. Thus integrating a plurality of base frequency regions into a wide band is called carrier aggregation.

For example, in FIG. 1, the system band of the LTE-A system is a system band (20 MHz×5=100 MHz) containing five component carrier bands in which a system band (base band: 20 MHz) of the LTE system is a single component carrier. In FIG. 1, a mobile terminal apparatus UE (User Equipment) #1 is a mobile terminal apparatus supporting the LTE-A system (also supporting the LTE system) and has a system band of 100 MHz, UE #2 is a mobile terminal apparatus supporting the LTE-A system (also supporting the LTE system) and has a system band of 40 MHz (20 MHz× 2=40 MHz), and UE #3 is a mobile terminal apparatus supporting the LTE system (not supporting the LTE-A system) and has a system band of 20 MHz (base band).

In a mobile communication system according to this Embodiment, in such an environment that mobile terminal apparatuses UEs with different transmission/reception bandwidths coexist, it is intended to enhance reception quality characteristics in mobile terminal apparatuses UEs by improving the frequency diversity effect in retransmitting transmission data to each mobile terminal apparatus UE. More specifically, a base station apparatus Node B that the mobile communication system has maps transmission data to each user to a single or plurality of group bands among group bands configured by dividing the system band into a plurality of bands in performing retransmission control, and it is thereby intended to improve the frequency diversity effect and to enhance reception quality characteristics in mobile terminal apparatuses UEs. In addition, the group band configured by dividing the system band into a plurality of groups is determined corresponding to instructions from an upper station apparatus of the base station apparatus Node B, as described specifically later. Further, in the following description, the description is given in the case of applying the invention to retransmission control of transmission data in the base station apparatus Node B, but the invention is not limited thereto, and is applicable to transmission control in initial transmission of transmission data.

Figure 2:
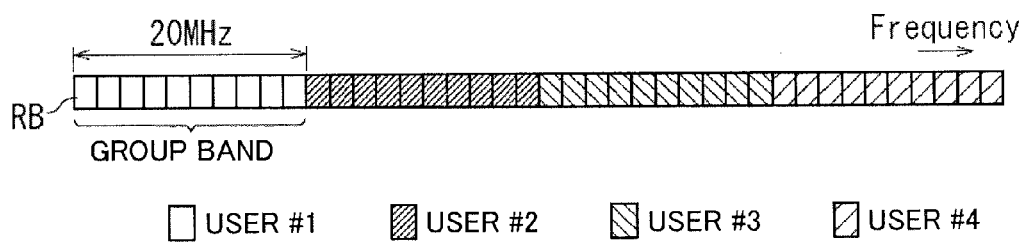
FIG. 2 contains schematic diagrams to explain the state of a system band in retransmission control in a base station apparatus according to one Embodiment of the invention.
Figure 2:
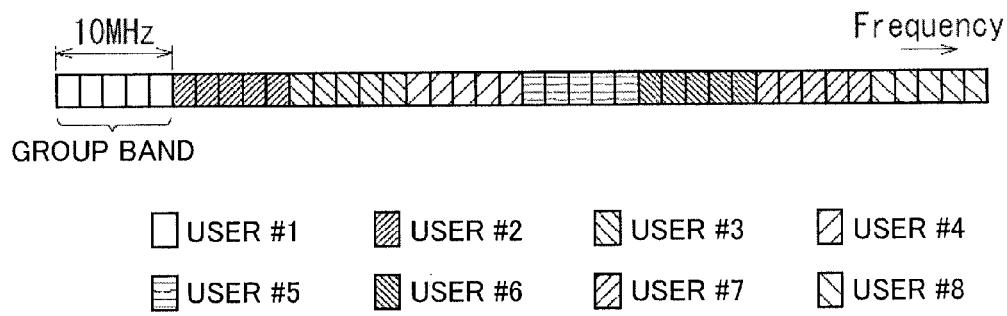

Described below is a state of the system band in retransmission control in the base station apparatus Node B according to this Embodiment. FIG. 2 contains schematic diagrams to explain the state of the system band in retransmission control in the base station apparatus Node B according to this Embodiment. In retransmission control in the base station apparatus Node B, as shown in FIG. 2, the system band is divided into a plurality of group bands, and transmission data to each user is assigned to a single or plurality of group bands. In addition, in the following description, it is assumed that the case is shown where the system bandwidth of the mobile communication system is 80 MHz, and the band up to 20 MHz is assigned to each user in retransmitting transmission data.

In FIG. 2(a), the case is shown where 20 MHz is designated as a bandwidth of a group band to which is mapped transmission data to each user, and the system band is divided into four group bands. Meanwhile, in FIG. 2(b), the case is shown where 10 MHz is designated as a bandwidth of a group band to which is mapped transmission data to each user, and the system band is divided into eight group bands. In FIG. 2, for convenience in description, the case is shown where transmission data to different users are mapped to respective group bands. In addition, the group band is comprised of a plurality of resource blocks (RBs). In FIG. 2, to simplify the description, the case is shown where a group band with 20 MHz is comprised of ten resource blocks.

The base station apparatus Node B maps transmission data to each user to a single or plurality of group bands among group bands configured by thus dividing the system band. For example, in the case of assigning the band of 20 MHz to transmission of transmission data of each user, each user is assigned a single group band in FIG. 2(a), while each user is assigned two group bands in FIG. 2(b). In each case, it is possible to retransmit transmission data to four users using the entire system band. By thus mapping the transmission data to each user to a single or plurality of group bands obtained by dividing the system band, it is possible to improve the frequency diversity effect, and to enhance reception quality characteristics in the mobile terminal apparatus. Particularly, in the case of mapping transmission data to each user to two group bands as shown in FIG. 2(b), since it is possible to map the transmission data to different bands, it is possible to obtain a higher frequency diversity effect, and to further enhance reception quality characteristics in the mobile terminal apparatus. Further, in the case of retransmitting the transmission data, it is possible to suppress deterioration in retransmission efficiency caused by increases in the transport block size, and to retransmit transmission signals efficiently.

In thus mapping the transmission data to each user to a single or plurality of group bands, the base station apparatus Node B i) maps the transmission data to an arbitrary group band based on reception quality information from the mobile terminal apparatus UE and/or throughput of the entire system (first mapping method), or ii) maps the transmission data based on a mapping pattern corresponding to a combination of group bands that is beforehand determined based on reception quality information from the mobile terminal apparatus UE and/or throughput of the entire system (second mapping method). These mapping methods are switched selectively in the base station apparatus Node B corresponding to instructions from the upper station apparatus.

In the first mapping method, since the transmission data is mapped to group bands good in the reception quality information in the mobile terminal apparatus UE and throughput of the entire system, it is possible to improve reception quality characteristics in the mobile terminal apparatus UE, but since the transmission data is mapped to an arbitrary group band, the information amount (signaling amount) to notify the mobile terminal apparatus UE of the group band of mapping increases corresponding to the number of group bands.

For example, as shown in FIG. 2(a), in the case that the system band is divided into four group bands and that the band of 20 MHz is assigned to mapping of transmission data to each user, four group bands exist to map the transmission data, and an information amount of two bits is required to identify the group bands. Meanwhile, as shown in FIG. 2(b), in the case that the system band is divided into eight group bands and that the band of 20 MHz is assigned to mapping of transmission data to each user, eight group bands exist to map the transmission data, and an information amount of five bits is required to identify the group bands.

Figure 3:
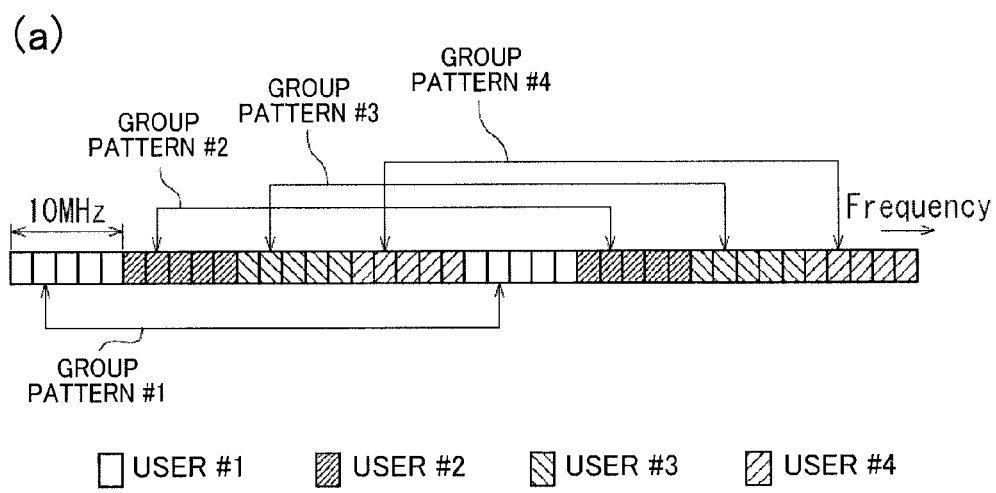
FIG. 3 contains schematic diagrams to explain the state of the system band when transmission data is mapped by a second mapping method in the base station apparatus according to the above-mentioned Embodiment.
Figure 3:
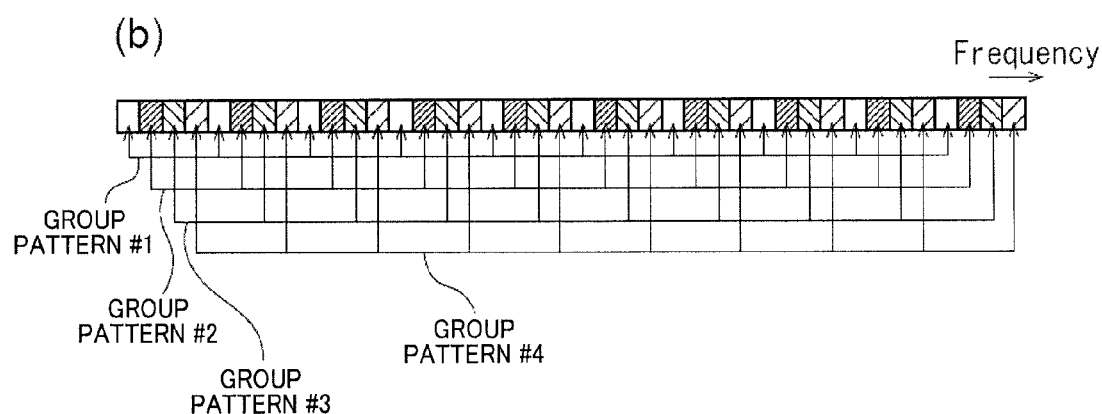

Meanwhile, in the second mapping method, since the transmission data is mapped to a combination of group bands good in the reception quality information in the mobile terminal apparatus UE and throughput of the entire system, the effect of improvement is small as compared with the first mapping method, but it is possible to improve reception quality characteristics in the mobile terminal apparatus UE. Further, since the transmission data is mapped based on a mapping pattern corresponding to a beforehand determined combination of group bands, it is possible to reduce the information amount to notify the mobile terminal apparatus UE of the group band to map as compared with the first mapping method. In other words, the second mapping method differs from the first mapping method in the respect that the information amount to notify of the group bands to map is reduced while limiting flexibility in selection of group bands to map. Referring to FIG. 3, described below is the state of the system band when transmission data is mapped by the second mapping method. FIG. 3 contains schematic diagrams to explain the state of the system band when transmission data is mapped by the second mapping method.

In FIG. 3(a), the state is the same as the state of the system band as shown in FIG. 2(b) in the respect that 10 MHz is designated as a bandwidth of a group band to which is mapped transmission data to each user, and that the system band is divided into eight group bands. However, in FIG. 3(a), the state is different from the state of the system band as shown in FIG. 2(b) in the respect that from the first frequency of the system band, as a combination, beforehand determined are group bands (Group pattern #1) in the 1st and 5th positions, group bands (Group pattern #2) in the 2nd and 6th positions, group bands (Group pattern #3) in the 3rd and 7th positions, and group bands (Group pattern #4) in the 4th and 8th positions. In FIG. 3(a), although eight group bands exist, since mapping patterns of transmission data are limited to four patterns, two bits are enough for the information amount to notify of the group bands to map. In addition, FIG. 3(a) shows the state in which transmission data to users #1 to #4 are respectively mapped to group patterns #1 to #4 based on the reception quality information in the mobile terminal apparatus UE, etc.

FIG. 3(b) shows the case where a bandwidth of the group band to which is mapped transmission data to each user is designated as a bandwidth (herein, 2 MHz) of a resource block, and the system band is divided into forty group bands. In FIG. 3(b), from the first frequency of the system band, as a combination, determined beforehand are group bands (Group pattern #1) in the 1st, 5th, 9th, 13th, 17th, 21st, 25th, 29th, 33rd, and 37th positions, group bands (Group pattern #2) in the 2nd, 6th, 10th, 14th, 18th, 22nd, 26th, 30th, 34th, and 38th positions, group bands (Group pattern #3) in the 3rd, 7th, 11th, 15th, 19th, 23rd, 27th, 31st, 35th, and 39th positions, and group bands (Group pattern #4) in the 4th, 8th, 12th, 16th, 20th, 24th, 28th, 32nd, 36th, and 40th positions. Therefore, in FIG. 3(b), although forty group bands exist, since mapping patterns of transmission data are limited to four patterns, two bits are enough for the information amount to notify of the group bands to map. In addition, also in FIG. 3(b), as in FIG. 3(a), shown is the state in which transmission data to users #1 to #4 are respectively mapped to group patterns #1 to #4 based on the reception quality information in the mobile terminal apparatus UE, etc.

In addition, in the second mapping method, as an Embodiment, it is preferable to map transmission data to each user to different group bands at transmission time intervals (TTI). In other words, in the second mapping method, since the transmission data to each user is mapped to the same group band, it is not possible to improve reception quality characteristics as compared with the first mapping method. As described above, in the case of mapping the transmission data to each user to different group bands at transmission time intervals, it is possible to map the transmission data to each user to group bands having different reception quality characteristics, and it is made possible to improve reception quality characteristics to some extent.

Figure 4:
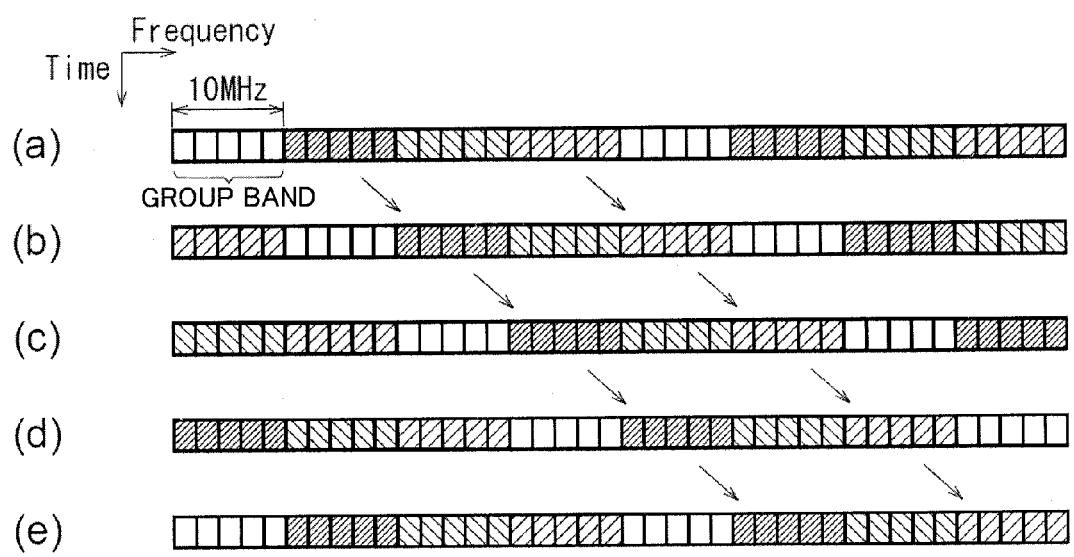
FIG. 4 contains schematic diagrams to explain the state of the system band when a group band to which the transmission data is mapped by the second mapping method is shifted to an adjacent group band at transmission time intervals.

In this case, for example, as shown in FIG. 4, it is conceivable to shift a group band to map the transmission data to each user to the adjacent group band at transmission time intervals. In the case of thus shifting the group band to map the transmission data to each user, since it is possible to map the transmission data to each user to different group bands at transmission time intervals without remarkably increasing the information amount to notify of the group bands to map, it is made possible to improve reception quality characteristics of the transmission data, while suppressing increases in the information amount to notify of the group bands to map. In addition, in FIG. 4, the configuration of group bands as shown in FIG. 3(a) is used as an example.

Further, in the case of selecting the above-mentioned first and second mapping methods, the base station apparatus Node B performs scheduling A to assign (transmission data to) each user to a group band, and scheduling B to assign the transmission data on a resource-block basis in the assigned group band. In this case, the base station apparatus Node B i) performs scheduling A and scheduling B in the same processing (first scheduling method), or ii) performs scheduling A and scheduling B independently (second scheduling method). In addition, these scheduling methods are switched selectively in the base station apparatus Node B corresponding to instructions from the upper station apparatus.

As the first scheduling method, there are a method of listing all conceivable assignment patterns from among combinations of all group bands configured by dividing the system band and all users to map transmission data, and searching for an assignment pattern to achieve the highest throughput in the entire system to perform scheduling (hereinafter, referred to as an "all search method"), and another method of performing scheduling on a resource-block basis corresponding to reception quality information in all resource blocks constituting the system band, while limiting the number of group bands to assign to each user (hereinafter, referred to as a "search method with number-of-group limitations").

In addition, in the all search method, the assignment pattern to achieve the highest throughput in the entire system is searched, and therefore, it is possible to most enhance throughput in the entire system in the first and second scheduling methods. On the other hand, the processing amount is enormous to search for a desired assignment pattern corresponding to the number of group bands and the number of users to assign to each group band. For example, when the number of group bands is "4" and the number of users is "32", the number of assignment patterns is "$4^{32}$" (about $1.9 \times 10^{19}$), and it is necessary to consider all the combinations.

Figure 5:
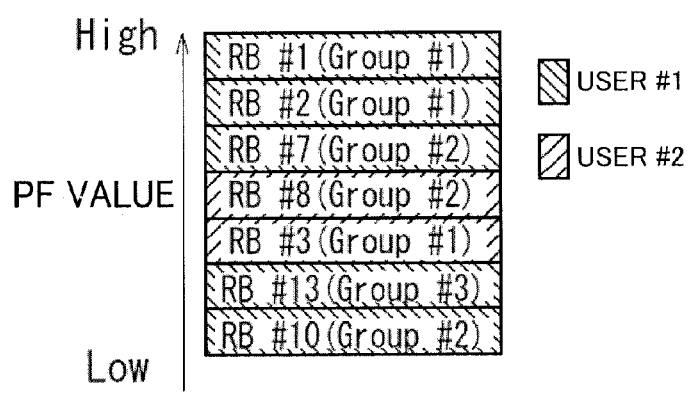
FIG. 5 contains diagrams to explain a search method with number-of-group limitations in the base station apparatus according to the above-mentioned Embodiment.
Figure 5:
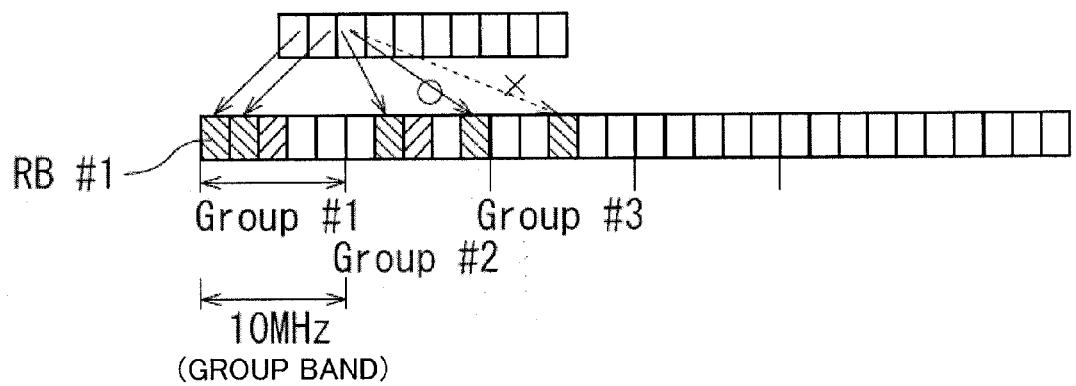

In the search method with number-of-group limitations, first, PF values are calculated by the Proportional Fairness method based on CQIs in all resource blocks constituting the system band, and resource blocks ranked by the PF values are obtained as shown in FIG. 5(a). In addition, the Proportional Fairness method is a method of measuring a ratio between instantaneous reception quality and average reception quality for each user, and allocating radio resources to a user of the highest value. Then, as shown in FIG. 5(b), scheduling is performed on a resource-block basis in descending order of the PF value of the resource block so as not to exceed the number of group bands assigned to each user. In addition, FIG. 5(b) shows the case that the number of group bands to assign to each user is "2". In other words, in FIG. 5(a), the 13th resource block (RB #13) assigned to user #1 is included in the third group band (Group #3). Since user #1 is already assigned the first and second group bands (Group #1, Group #2), scheduling to the resource block (RB #13) is restricted. In the search method with number-of-group limitations, it is possible to enhance throughput in the entire system, while significantly reducing the processing amount as compared with the above-mentioned all search method.

In addition, herein, in the search method with number-of-group limitations, the case is shown where PF values are calculated as reception quality information in all the resource blocks constituting the system band, and scheduling is performed on a resource-block basis based on the PF values, but the reception quality information is not limited thereto. For example, an SINR value measured in the mobile terminal apparatus UE is used as the reception quality information, and scheduling may be performed on a resource-block basis based on the SINR value. Also in this case, as in the case of using the PF value, it is possible to enhance throughput in the entire system, while significantly reducing the processing amount as compared with the above-mentioned all search method.

Meanwhile, as the second scheduling method, there is a search method (hereinafter, referred to as an "independent search method") for assigning users to group bands based on the average reception quality information of the group bands, and then, performing scheduling to assign the transmission data on a resource-block basis in the assigned group band, and another search method (hereinafter, referred to as a "recursive type search method") for performing scheduling on a resource-block basis corresponding to the reception quality information in all the resource blocks constituting the system band, and then, dividing the system band into a plurality of bands to assign a group band with a high data rate to each user, while performing scheduling on a resource-block basis in the divided band.

In the independent search method, for example, assignment of users to group bands is performed based on the average SINR value or PF value of the group band, or the average SINR value or PF value of the predetermined number of resource blocks with good SINR values or PF values among resource blocks included in the group band. In addition, when the user is thus assigned to each group band, a plurality of users is assigned to the group band. In this case, when users are assigned without any limitation, the difference occurs in the number of users to assign between group bands, and such a situation occurs that throughput of the entire system decreases. To prevent the difference in the number of users to assign between group bands from occurring, the number of users to assign to each group band may be limited to equalize the number of users. From the same viewpoint, the interference power amount and data load amount may be made constant in each group band. Then, after thus assigning users to group bands, in the independent search method, scheduling is performed on a resource-block basis corresponding to the reception quality information (SINR value and PF value) in all the resource blocks constituting the assigned group band.

Figure 6:
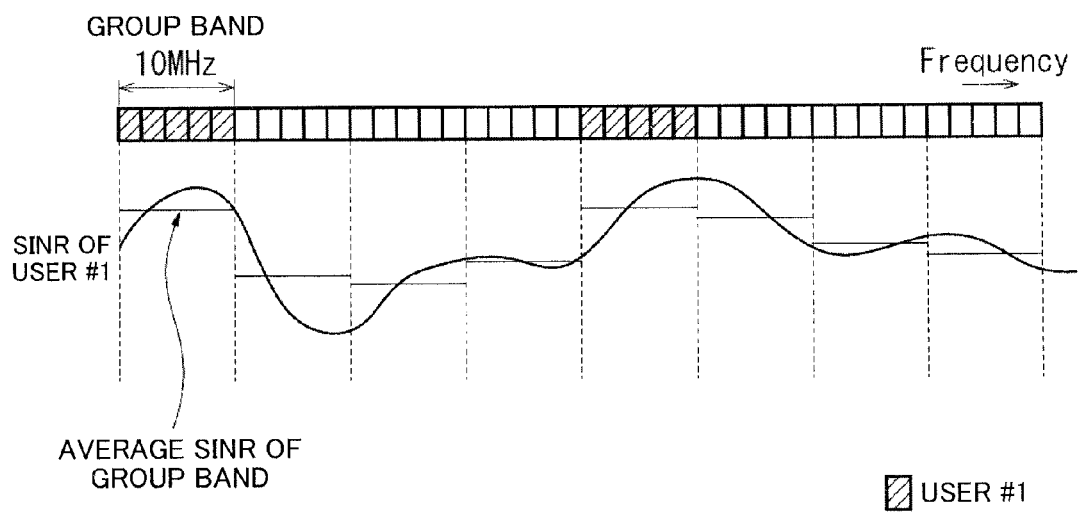
FIG. 6 is a diagram to explain an independent search method in the base station apparatus according to the above-mentioned Embodiment.

FIG. 6 is an explanatory diagram of the state of the system band in the case where assignment of user #1 to group bands is performed based on the average SINR of the group band in the independent search method. In addition, in FIG. 6, the case is shown where the group band is 10 MHz, and the band assigned to each user is 20 MHz. Further, in FIG. 6, the case is shown where assignment of user #1 to group bands is performed based on the average SINR of each group band among SINRs measured in the mobile terminal apparatus UE of user #1.

As shown in FIG. 6, since the average SINR of the group band in user #1 is the highest in the first and fifth group bands, the transmission data of user #1 is assigned to these group bands. Thus, in the independent search method, for example, since assignment of the user to a group band is performed based on the average SINR of the group band, it is possible to enhance reception quality characteristics in the mobile terminal apparatus UE. Particularly, as shown in FIG. 6, in the case of assigning the user to a plurality of group bands, it is possible to obtain an extremely high diversity effect, and to more enhance reception quality characteristics in the mobile terminal apparatus UE.

As the recursive type search method, there are a first recursive type search method of performing scheduling on a resource-block basis using the reception quality information such as the PF value, then dividing the system band into group bandwidths, assigning a group band with a high data rate to each user, selecting two group bands with high data rates (or SINR values) for each user, and performing again scheduling on a resource-block basis using the reception quality information such as the PF value, and a second recursive type search method of repeating processing for dividing the system band into two bands to assign a group band with a high data rate (or SINR value) to each user, while performing scheduling on a resource-block basis using the reception quality information such as the PF value in the divided band, until the divided band reaches the designated group band.

Figure 7:
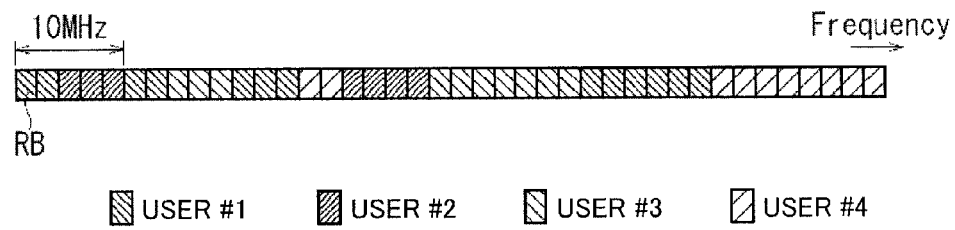
FIG. 7 contains diagrams to explain a first recursive type search method in the base station apparatus according to the above-mentioned Embodiment.
Figure 7:
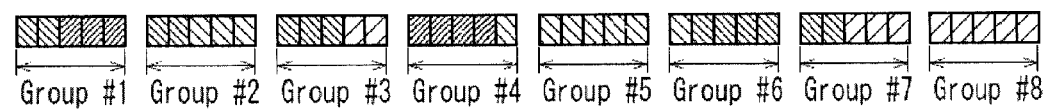
Figure 7:
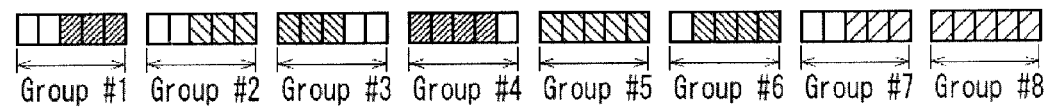
Figure 7:
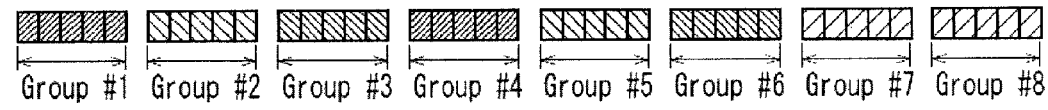

In the first recursive type search method, first, as shown in FIG. 7(a), for example, scheduling is performed on a resource-block basis using PF values calculated based on CQIs in all the resource blocks constituting the system band. Next, as shown in FIG. 7(b), the system band is divided into group bandwidths (herein, 10 MHz), and each user is assigned a group band with a high data rate (herein, for convenience in description, it is assumed that the data rate is higher as the number of resource blocks is higher.) Then, as shown in FIG. 7(c), two group bands with high data rates are selected for each user. For example, in user #1, the third and sixth group bands are selected as two group bands with high data rates (Group #3, Group #6). In addition, in this case, the transmission data of a user (user #4 in Group #3) that is not selected is deleted from the group band. Eventually, as shown in FIG. 7(d), in each group band, scheduling is performed again on a resource-block basis using the PF values. In this first recursive type search method, scheduling is performed while reflecting the PF values calculated based on the CQI in the resource block, and it is thereby possible to enhance reception quality characteristics in the mobile terminal apparatus UE.

Figure 8:
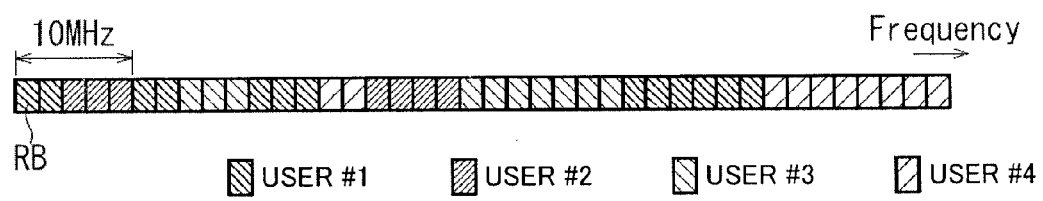
FIG. 8 contains diagrams to explain a second recursive type search method in the base station apparatus according to the above-mentioned Embodiment.
Figure 8:
Figure 8:

In the second recursive type search method, first, as shown in FIG. 8(a), for example, scheduling is performed on a resource-block basis using PF values calculated based on CQIs in all the resource blocks constituting the system band. Next, as shown in FIG. 8(b), the system band is divided into two bands, and each user is assigned a group band with a high data rate. For example, for user #1, seven resource blocks in the band on the left side are assigned, while six resource blocks in the band on the right side are assigned. Meanwhile, for user #2, seven resource blocks in the band on the left side are assigned, while any resource block in the band on the right side is not assigned. Therefore, user #1 and user #2 are assigned the band on the left side. Then, as shown in FIG. 8(c), scheduling on a resource-block basis is performed using the PF value in the divided band. Further, the processing for dividing the divided band into two bands, and assigning a group band with a high data rate to each user, while performing scheduling on a resource-block basis using the PF value in the divided band is repeated until the divided band reaches the designated group band (for example, 10 MHz). Also in the second recursive type search method, as in the first recursive type search method, scheduling is performed while reflecting the PF values calculated based on the CQIs in the resource blocks, and it is thereby possible to enhance reception quality characteristics in the mobile terminal apparatus UE.

In addition, herein, in the first and second recursive type search methods, the case is shown where PF values are calculated as reception quality information in all the resource blocks constituting the system band, and scheduling is performed on a resource-block basis based on the PF values, but the reception quality information is not limited thereto. For example, an SINR value measured in the mobile terminal apparatus UE is used as the reception quality information, and scheduling may be performed on a resource-block basis based on the SINR value. Also in this case, as in the case of using the PF value, scheduling is performed while reflecting the SINR value in the resource block, and it is thereby possible to enhance reception quality characteristics in the mobile terminal apparatus UE.

In the scheduling methods other than the all search method as described above, the number of users to assign to each group band becomes unbalanced particularly when the number of users to map the transmission data is low, there arises a group band that is not assigned users, and such a situation may occur that throughput of the entire system decreases. To prevent throughput from thus deteriorating due to existence of the group band that is not assigned users, it is preferable to control the number of users to assign to each group band.

Therefore, the base station apparatus Node B1) defines an upper limit to the number of users assigned to each group band, or defines a lower limit to the number of users assigned to each group band. In the case of defining the upper limit to the number of users assigned to each group band, it is possible to suppress fluctuations in the number of users assigned to each group band, it is thereby possible to make it hard that a group band that is not assigned users arises, and it is possible to prevent occurrence of the situation that throughput of the entire system decreases. Meanwhile, in the case of defining the lower limit to the number of users assigned to each group band, it is possible to reliably prevent the group that is not assigned users from occurring, and it is possible to prevent occurrence of the situation that throughput of the entire system decreases.

According to these first and second mapping methods, the base station apparatus Node B maps the transmission data to each user to a single or plurality of group bands, and notifies the mobile terminal apparatus UE of each user of the group band to which the data is mapped as mapping information. In notifying of the mapping information, the base station apparatus Node B1) notifies at starting mapping of the transmission data (first notification method), 2) notifies at transmission time intervals (TTI) of the transmission data (second notification method), or 3) notifies by signaling in the upper layer (third notification method). These notification methods are switched selectively in the base station apparatus Node B corresponding to instructions from the upper layer station.

The first notification method is used, for example, in the case of mapping transmission data to the group band by the above-mentioned second mapping method. For notification of the mapping information, for example, broadcast information and RRC signaling is used. In this case, it is enough to notify of the mapping information only once at starting mapping of the transmission data, and it is thereby possible to reduce the signaling amount required to notify of the mapping information to a small amount.

The second notification method is used, for example, in the case of switching the group band to assign to the user at transmission time intervals according to the above-mentioned first mapping method. For notification of the mapping information, for example, a control signal is used. In this case, it is possible to suitably notify the user of the group band that is switched and assigned at transmission time intervals, but since it is necessary to notify of the mapping information at transmission time intervals, the signaling amount to notify of the mapping information increases corresponding to the number of group bands and the number of users. In addition, this second notification method is also used in the case of changing the group band to map the transmission data at transmission time intervals by the above-mentioned second mapping method (see FIG. 4).

The third notification method is used, for example, in the case of switching the group band to map at intervals longer than the transmission time interval. For notification of the mapping information, for example, the broadcast information and RRC signaling is used. In this case, it is not possible to reduce the signaling amount to notify of the mapping information to the small amount in the case of the first notification method, but it is possible to keep the signaling amount lower than in the case of the second notification method.

Figure 9:
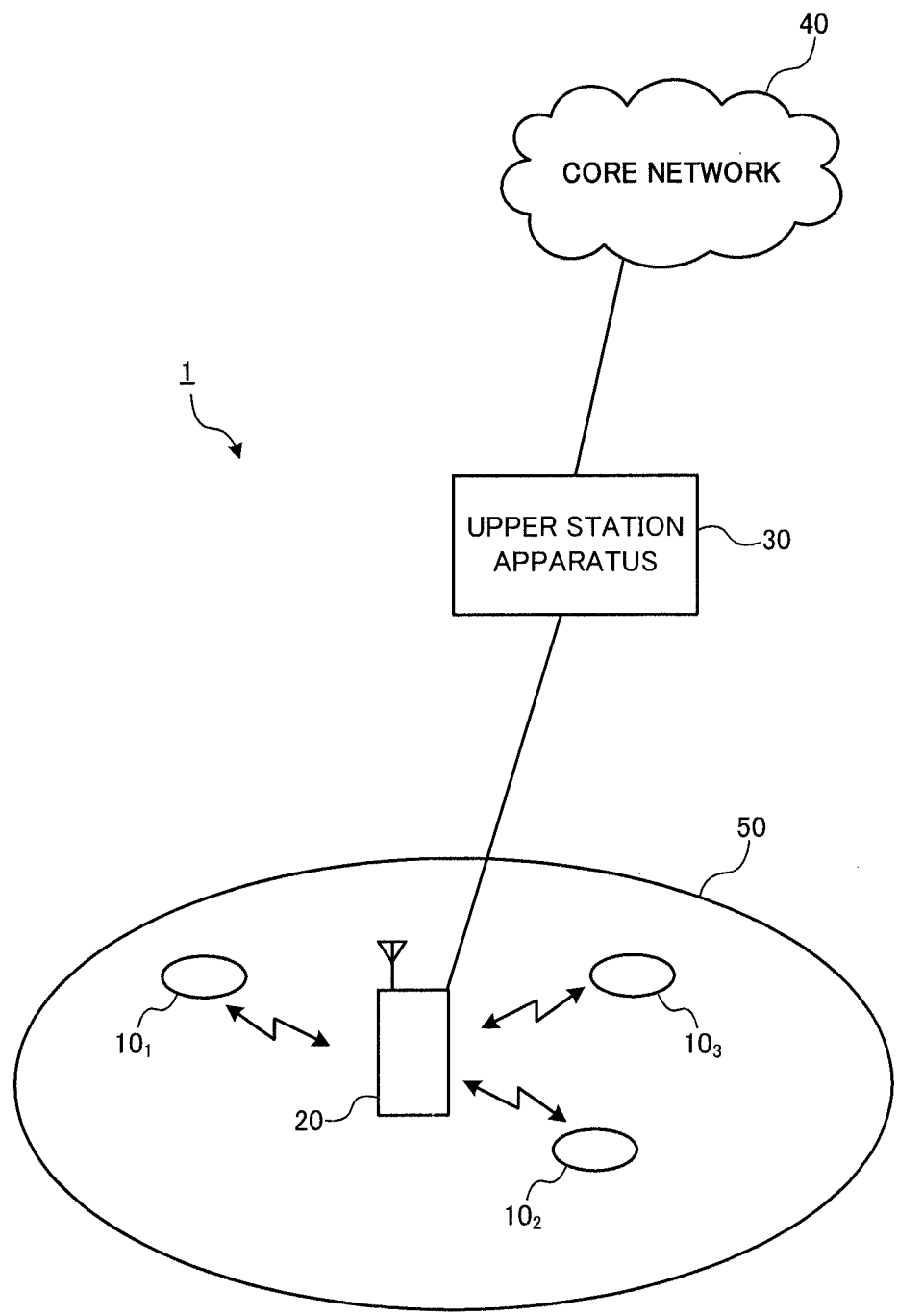
FIG. 9 is a diagram to explain a configuration of a mobile communication system having mobile terminal apparatuses and the base station apparatus according to the above-mentioned Embodiment.

The Embodiment of the invention will be described below with reference to drawings. Referring to FIG. 9, described is a mobile communication system 1 having mobile terminal apparatuses (UEs) 10 and base station apparatus (Node B) 20 according to the Embodiment of the invention. FIG. 9 is a diagram to explain a configuration of the mobile communication system 1 having mobile terminal apparatuses (UEs) 10 and the base station apparatus 20 according to this Embodiment. In addition, the mobile communication system 1 as shown in FIG. 9 is a system including, for example, Evolved UTRA and UTRAN (alias: LTE (Long Term Evolution)) or SUPER 3G. Further, the mobile communication system 1 may be called IMT-Advanced or 4G.

As shown in FIG. 9, the mobile communication system 1 includes the base station apparatus 20 and a plurality of mobile terminal apparatuses 10 ($10_1$, $10_2$, $10_3$, ..., $10_n$, n is an integer where n>0) that communicate with the base station apparatus 20 and is comprised thereof. The base station apparatus 20 is connected to an upper station apparatus 30, and the upper station apparatus 30 is connected to a core network 40. The mobile terminal apparatus 10 communicates with the base station apparatus 20 in a cell 50 by Evolved UTRA and UTRAN. In addition, for example, the upper station apparatus 30 includes an access gateway apparatus, radio network controller (RNC), mobility management entity (MME), etc., but is not limited thereto.

Each of the mobile terminal apparatuses 10 ($10_1$, $10_2$, $10_3$, ..., $10_n$) has the same configuration, function and state, and is described as a mobile terminal apparatus 10 unless otherwise specified in the following description. For convenience in description, equipment that performs radio communication with the base station apparatus 20 is the mobile terminal apparatus 10, and more generally, is user equipment (UE) including mobile terminals and fixed terminals.

In the mobile communication system 1, as a radio access scheme, OFDMA (Orthogonal Frequency Division Multiplexing Access) is applied in downlink, while SC-FDMA (Single-Carrier Frequency Division Multiple Access) is applied in uplink. As described above, OFDMA is a multicarrier transmission system for dividing a frequency band into a plurality of narrow frequency bands (subcarriers), and mapping data to each subcarrier to perform communication. SC-FDMA is a single-carrier transmission system for dividing the system band into bands comprised of a single or consecutive resource blocks for each terminal so that a plurality of terminals uses different frequency bands, and thereby reducing interference among the terminals.

Described herein are communication channels in Evolved UTRA and UTRAN. In downlink, used are the Physical Downlink Shared Channel (PDSCH) shared among the mobile terminal apparatuses 10, and the physical downlink control channel (downlink L1/L2 control channel). On the Physical Downlink Shared Chanel, user data i.e. normal data signals are transmitted. The transmission data is included in the user data. Further, on the physical downlink control channel is notified the mapping information including the group band to which the data is mapped in the above-mentioned second notification method, etc.

Further, in downlink, broadcast channels such as the Physical-Broadcast Channel (P-BCH) are transmitted. On the broadcast channel is notified the mapping information including the group band to which the data is mapped in the above-mentioned first notification method, etc. The P-BCH is mapped to the above-mentioned PDSCH, and transmitted from the base station apparatus 20 to the mobile terminal apparatus 10.

In uplink, used are the Physical Uplink Shared Channel (PUSCH) shared among the mobile terminal apparatuses 10, and the Physical Uplink Control Channel (PUCCH) that is a control channel in uplink. User data i.e. normal data signals are transmitted on the Physical Uplink Shared Channel. Meanwhile, on the Physical Uplink Control Channel is transmitted radio quality information (CQI: Channel Quality Indicator) in downlink, etc.

Further, in uplink, defined is the Physical Random Access Channel (PRACH) for initial connection, etc. The mobile terminal apparatus 10 transmits a random access preamble on the PRACH.

Figure 10:
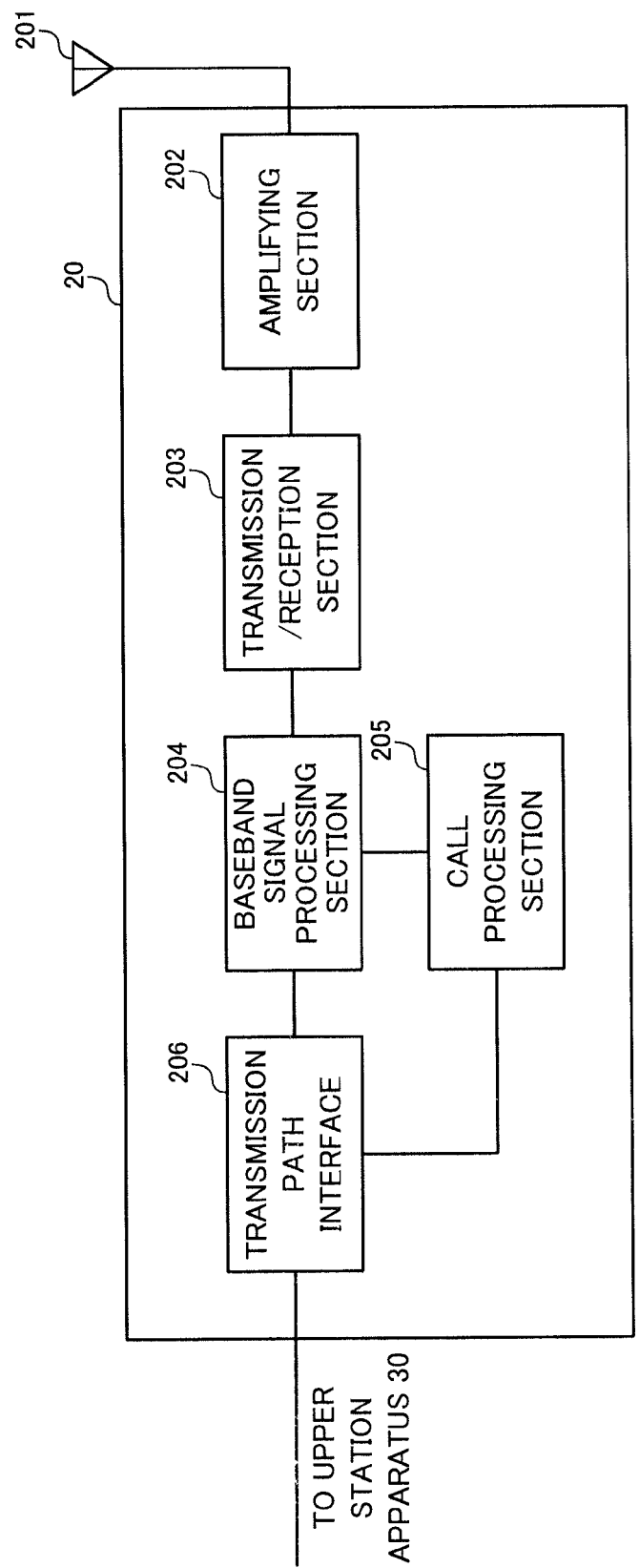
FIG. 10 is a block diagram illustrating a configuration of the base station apparatus according to the above-mentioned Embodiment.

Herein, a configuration of the base station apparatus 20 according to this Embodiment will be described with reference to FIG. 10. As shown in FIG. 10, the base station apparatus 20 is provided with a transmission/reception antenna 201, amplifying section 202, transmission/reception section 203, baseband signal processing section 204, call processing section 205 and transmission path interface 206.

The user data transmitted from the base station apparatus 20 to the mobile terminal apparatus 10 in downlink is input to the baseband signal processing section 204 via the transmission path interface 206 from the upper station apparatus 30 positioned higher than the base station apparatus 20.

The baseband signal processing section 204 performs PDCP layer processing, segmentation and concatenation of user data, RLC (Radio Link Control) layer transmission processing such as transmission processing of RLC retransmission control, MAC (Medium Access Control) retransmission control e.g. transmission processing of HARQ (Hybrid Automatic Repeat reQuest), scheduling, transmission format selection, channel coding, Inverse Fast Fourier Transform (IFFT) processing and precoding processing on the data to transfer to the transmission/reception section 203. Further, with respect to signals of the Physical Downlink Control Channel that is a downlink control channel, the transmission processing such as channel coding and Inverse Fast Fourier Transform is performed, and the resultant is transferred to the transmission/reception section 203.

Further, on the above-mentioned broadcast channel, the baseband signal processing section 204 notifies the mobile terminal apparatus 10 of control information (hereinafter, referred to as "broadcast information") for communications in the cell 50. For example, the broadcast information for communications in the cell 50 includes the system bandwidth in uplink or downlink, identification information (Root Sequence Index) of a root sequence to generate a signal of a random access preamble on the PRACH, etc. Further, the broadcast information includes the mapping information including the group band to which data is mapped, according to the mapping method selected in the base station apparatus 20.

The transmission/reception section 203 performs frequency conversion processing for converting the baseband signal output from the baseband signal processing section 204 into a signal with a radio frequency band, and then, the signal is amplified in the amplifying section 202 and transmitted from the transmission/reception antenna 201. In addition, the transmission function that the transmission/reception section 203 has constitutes the transmission section.

Meanwhile, with respect to data transmitted from the mobile terminal apparatus 10 to the base station apparatus 20 in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT processing, IDFT processing, error correcting decoding, reception processing of MAC retransmission control, and reception processing of RLC layer and PDCP layer on the user data included in the input baseband signal, and transfers the resultant to the upper station apparatus 30 via the transmission path interface 206.

The call processing section 205 performs call processing such as setting and release of the communication channel, status management of the base station apparatus 200, and management of radio resources.

Figure 11:
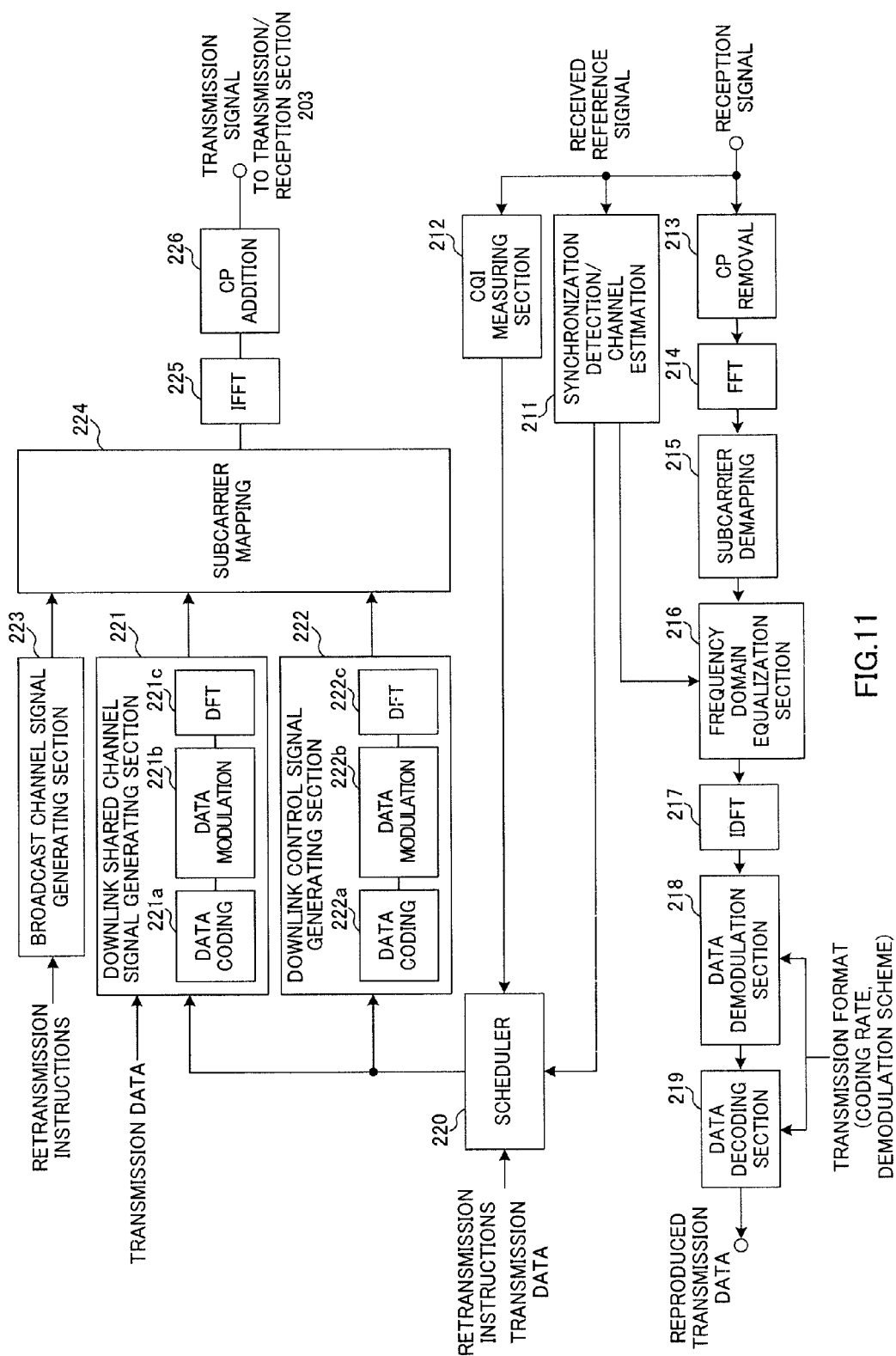
FIG. 11 is a functional block diagram of a baseband signal processing section of the base station apparatus according to the above-mentioned Embodiment.

FIG. 11 is a functional block diagram of the baseband signal processing section 204 of the base station apparatus 20 according to this Embodiment. A reference signal included in the reception signal is input to a synchronization detection/channel estimation section 211 and a CQI measuring section 212. The synchronization detection/channel estimation section 211 estimates a channel state in uplink based on the reception state of the reference signal received from the mobile terminal apparatus 10. The CQI measuring section 212 measures a CQI from a broadband quality measurement reference signal received from the mobile terminal apparatus 10. Meanwhile, with respect to the reception signal input to the baseband signal processing section 204, a CP removal section 213 removes a cyclic prefix that is added to the reception signal, and then, a Fast Fourier Transform section 214 performs Fourier transform on the resultant to transform into information in the frequency domain. The reception signal transformed to the information in the frequency domain is demapped in a subcarrier demapping section 215. The subcarrier demapping section 215 performs demapping corresponding to mapping in the mobile terminal apparatus 10. A frequency domain equalization section 216 equalizes the reception signal based on a channel estimation value provided from the synchronization detection/channel estimation section 211. An inverse discrete Fourier transform section 217 performs inverse discrete Fourier transform on the reception signal, and restores the signal in the frequency domain to the signal in the time domain. Then, a data demodulation section 218 and data decoding section 219 demodulate and decode the signal based on a transmission format (coding rate, modulation scheme), and the transmission data is reproduced.

A scheduler 220 receives transmission data and retransmission instructions input from the upper station apparatus 30 that processes transmission signals. The retransmission instructions include the content for designating a bandwidth of the above-mentioned group band, while further including the content for designating a mapping method of transmission data corresponding to the group band. For example, as shown in FIG. 2(*a*), the retransmission instructions include the content for designating the bandwidth of the group band as 20 MHz, while designating the above-mentioned first mapping method, or as shown in FIG. 3(*a*), include the content for designating the bandwidth of the group band as 10 MHz, while designating the above-mentioned second mapping method. In addition, when the first mapping method is designated, the above-mentioned first and second scheduling methods are also designated, while any one (for example, the above-mentioned search method with group-of-number limitations) of scheduling methods is designated in the first and second scheduling methods. Meanwhile, when the second mapping method is designated, a mapping pattern corresponding to a beforehand determined combination of group bands is also designated. Further, the retransmission instructions include the content for designating the notification method of the mapping information for the mobile terminal apparatus 10 corresponding to the mapping method of transmission data. For example, the retransmission instructions include the content for designating the above-mentioned first to third notification methods. Meanwhile, the scheduler 220 receives the channel estimation value estimated in the synchronization detection/channel estimation section 211 and the CQI measured in the CQI measuring section 212. Based on the content of the retransmission instructions input from the upper station apparatus 30, the scheduler 220 performs scheduling of uplink and downlink control signals and uplink and downlink shared channel signals while referring to the channel estimation value and CQI.

Based on schedule information determined in the scheduler 220, a downlink shared channel signal generating section 221 generates a downlink shared channel signal using transmission data from the upper station apparatus 30. In the downlink shared channel signal generating section 221, the transmission data is coded in a coding section 221a, modulated in a data modulation section 221b, then subjected to Fourier Transform in a discrete Fourier transform section 221c, where the time-series information is transformed into the information in the frequency domain, and is output to the subcarrier mapping section 224.

Based on the schedule information determined in the scheduler 220, a downlink control signal generating section 222 generates a downlink control signal. In the downlink control signal generating section 222, the information for downlink control signals is coded in a coding section 222a, modulated in a data modulation section 222b, than subjected to Fourier Transform in a discrete Fourier transform section 221c, where the time-series information is transformed into the information in the frequency domain, and is output to the subcarrier mapping section 224. For example, in the case of notifying the mobile terminal apparatus 10 of the mapping information by the above-mentioned second notification method, the downlink control signal including the mapping information is generated.

A broadcast channel signal generating section 223 receives retransmission instructions input from the upper station apparatus 30. In the case of notifying the mobile terminal apparatus 10 of the mapping information by the above-mentioned first or third notification method, the broadcast channel signal generating section 223 generates a broadcast channel signal including the mapping information. The generated broadcast channel signal is output to the subcarrier mapping section 224.

The subcarrier mapping section 224 functions as the mapping section, and performs mapping on subcarriers of a downlink shared channel signal input from the downlink shared channel signal generating section 221, a downlink control signal input from the downlink control signal generating section 222, and a broadcast channel signal input from the broadcast channel signal generating section 223. In this case, the downlink shared channel signal and downlink control signal are mapped to group bands corresponding to the content of the retransmission instructions from the upper station apparatus 30.

The transmission data mapped in the subcarrier mapping section 224 is subjected to Inverse Fast Fourier Transform in an Inverse Fast Fourier Transform section 225, where the signal in the frequency domain is transformed into a time-series signal, and then, is given a cyclic prefix in the cyclic prefix adding section (CP addition section) 226. In addition, the cyclic prefix functions as a guard interval to absorb the difference in multipath propagation delay. The transmission data given the cyclic prefix is output to the transmission/reception section 203.

Figure 12:
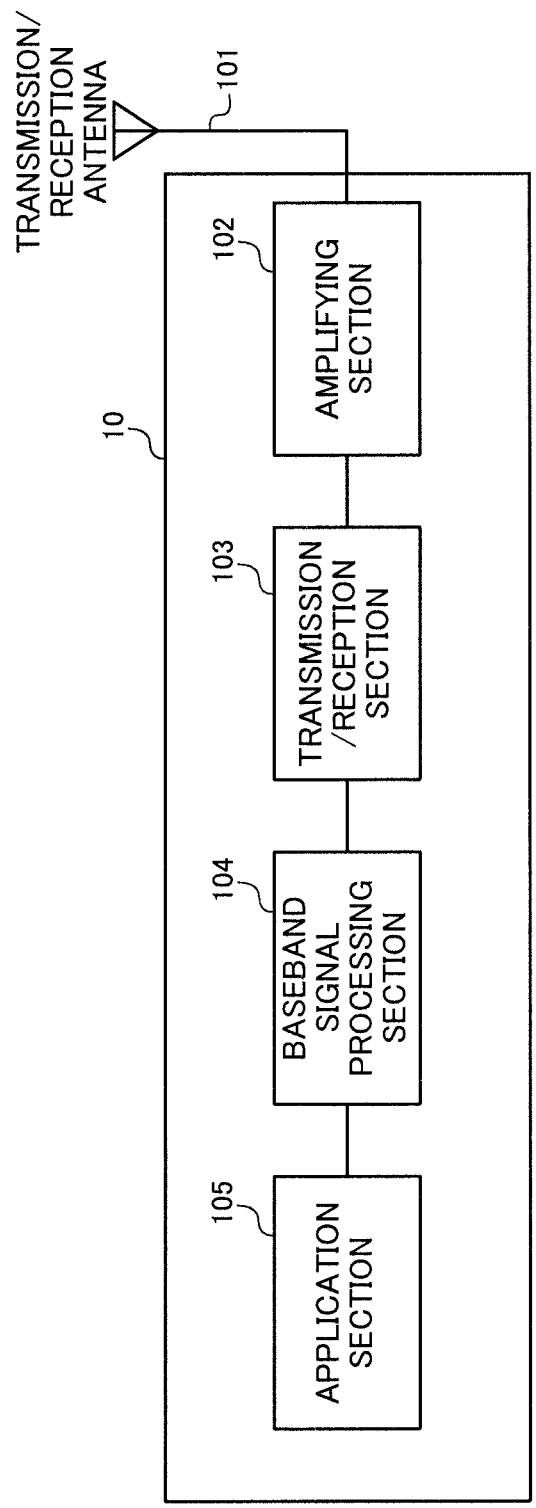
FIG. 12 is a block diagram illustrating a configuration of a mobile terminal apparatus according to the above-mentioned Embodiment.

Referring to FIG. 12, described next is a configuration of the mobile terminal apparatus 10 according to this Embodiment. As shown in FIG. 12, the mobile terminal apparatus 10 is provided with a transmission/reception antenna 101, amplifying section 102, transmission/reception section 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, user data in downlink is transferred to the application section 105. The application section 105 performs processing concerning layers higher than the physical layer and MAC layer. Further, among the data in downlink, broadcast information is also transferred to the application section 105.

Meanwhile, the application section 105 inputs user data in uplink to the baseband signal processing section 104. The baseband signal processing section 104 performs transmission processing of retransmission control (H-ARQ (Hybrid ARQ)), channel coding, DFT processing, IFFT processing, etc. on the data to transfer to the transmission/reception section 103. The transmission/reception section 103 performs frequency conversion processing for converting the baseband signal output from the baseband signal processing section 104 into a signal with a radio frequency band, and then, the signal is amplified in the amplifying section 102, and is transmitted from the transmission/reception antenna 101.

Figure 13:
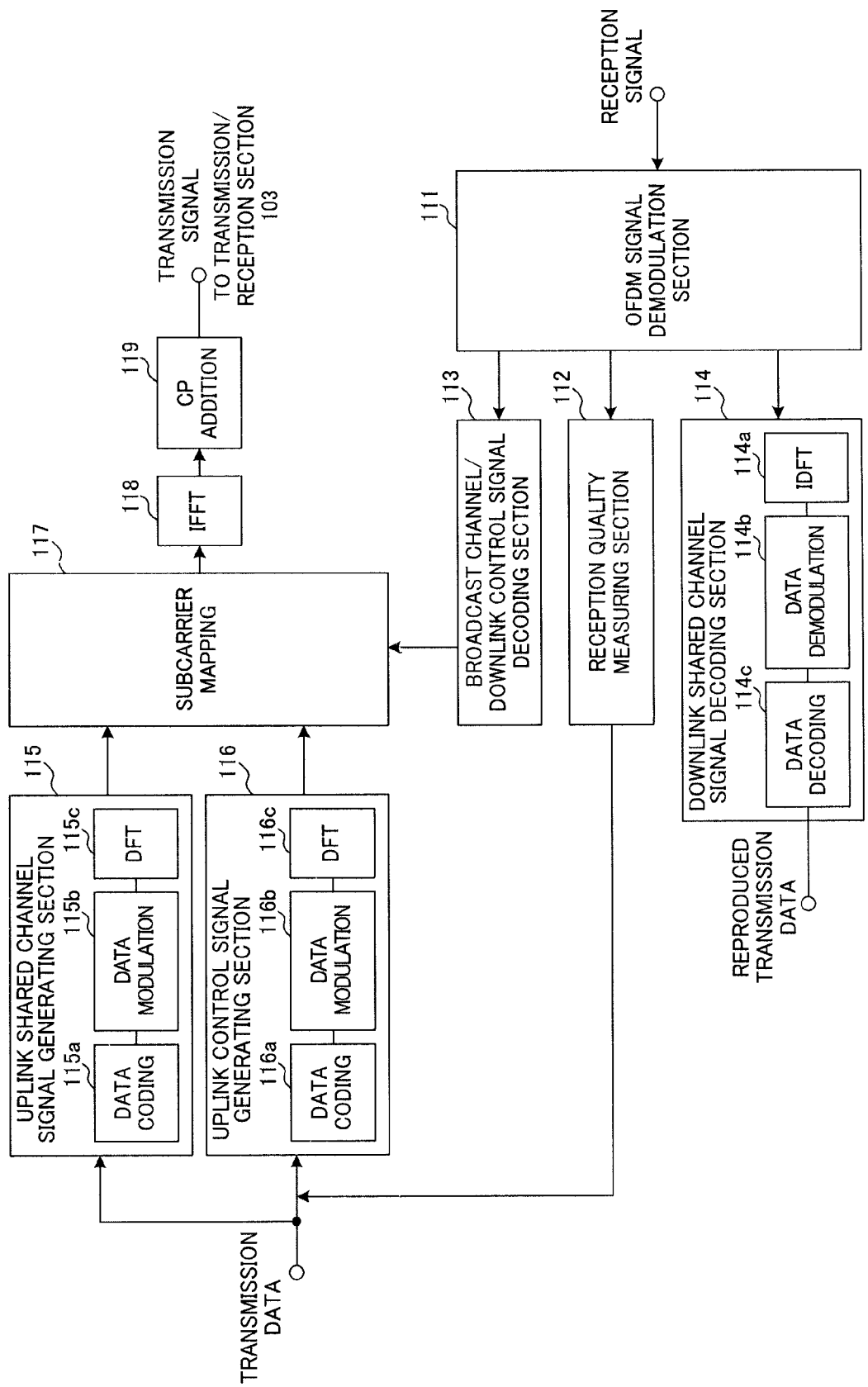
FIG. 13 is a functional block diagram of a baseband signal processing section of the mobile terminal apparatus according to the above-mentioned Embodiment.

FIG. 13 is a functional block diagram of the baseband signal processing section 104 of the mobile terminal apparatus 10 according to this Embodiment. A reception signal output from the transmission/reception section 103 is demodulated in an OFDM signal demodulation section 111. A reception quality measuring section 112 measures reception quality from a reception state of a received reference signal. The reception quality measuring section 112 measures reception quality of a channel over the broadband used for the base station apparatus 20 in downlink OFDM communication, and notifies an uplink control signal generating section 116 described later of the measured reception quality information. A broadcast channel/downlink control signal decoding section 113 decodes a broadcast channel signal and downlink control signal from the OFDM-demodulated downlink reception signal, and notifies a subcarrier mapping section 117, described later, of mapping information included in the signals. The mapping information included in the downlink control signal is reflected in OFDM demodulation in the OFDM signal demodulation section 111. By this means, the mobile terminal apparatus 10 is capable of identifying the group band that is assigned to the mobile terminal apparatus 10 in the base station apparatus 20. A downlink shared channel signal decoding section 114 decodes a downlink shared channel from the OFDM-demodulated downlink reception signal. In the downlink shared channel signal decoding section 114, an inverse discrete Fourier transform section 114a performs inverse discrete Fourier transform on the reception signal, the signal in the frequency domain is thereby transformed into a signal in the time domain, and then, demodulated and decoded in a data demodulation section 114b and data decoding section 114c based on a transmission format (coding rate, modulation scheme), and the transmission data is reproduced.

An uplink shared channel signal generating section 115 generates an uplink shared channel signal using the transmission data provided from the application section 105. In the uplink shared channel signal generating section 115, the transmission data is coded in a coding section 115a, modulated in a data modulation section 115b, then subjected to Fourier Transform in a discrete Fourier transform section 115c, where the time-series information is transformed into the information in the frequency domain, and is output to the subcarrier mapping section 117.

Based on the transmission data provided from the application section 105 and the reception quality information notified from the reception quality measuring section 112, an uplink control signal generating section 116 generates an uplink control signal. In the uplink control signal generating section 116, the information for uplink control signals is coded in a coding section 116a, modulated in a data modulation section 116b, then subjected to Fourier Transform in a discrete Fourier transform section 116c, where the time-series information is transformed into the information in the frequency domain, and is output to the subcarrier mapping section 117.

The subcarrier mapping section 117 performs mapping on subcarriers of an uplink shared channel signal input from the uplink shared channel signal generating section 115, and an uplink control signal input from the uplink control signal generating section 116. In this case, the uplink shared channel signal and uplink control signal are mapped to group bands designated from the base station apparatus 20 corresponding to the mapping information notified from the broadcast channel/downlink control signal decoding section 113.

The transmission data mapped in the subcarrier mapping section 117 is subjected to Inverse Fast Fourier Transform in an Inverse Fast Fourier Transform section 118, where the signal in the frequency domain is transformed into a time-series signal, and then, is given a cyclic prefix in a cyclic prefix adding section (CP addition section) 119. In addition, the cyclic prefix functions as a guard interval to absorb differences in multipath propagation delay and in reception timing among a plurality of users in the base station apparatus 20. The transmission data given the cyclic prefix is output to the transmission/reception section 103.

Thus, in the mobile communication system 1 according to this Embodiment, the base station apparatus 20 maps transmission data to each user to a single or plurality of group bands among group bands configured by dividing the system band into a plurality of bands, and transmits the mapped transmission data to the mobile terminal apparatus 10 in downlink, and therefore, even when the system bandwidth is extended, it is possible to improve the frequency diversity effect and to enhance reception quality characteristics in the mobile terminal apparatus. Particularly, in the case of mapping transmission data to each user to a plurality of group bands, since it is possible to map the transmission data to different bands, it is possible to obtain a higher frequency diversity effect, and to further enhance reception quality characteristics in the mobile terminal apparatus. Further, when the transmission data is retransmitted, it is possible to suppress deterioration in retransmission efficiency caused by increases in the transport block size, and to transmit the transmission data efficiently.

Particularly, the base station apparatus 20 according to this Embodiment is capable of mapping the transmission data to an arbitrary group band based on the reception quality information from the mobile terminal apparatus 10 and throughput of the entire system (first mapping method), and is thereby able to map the transmission data to a group band good in the reception quality information in the mobile terminal apparatus and throughput of the entire system, and it is possible to improve reception quality characteristics in the mobile terminal apparatus 10.

Further, since the base station apparatus 20 according to this Embodiment is capable of mapping the transmission data based on a mapping pattern corresponding to a combination of group bands that is beforehand determined based on the reception quality information from the mobile terminal apparatus 10 and throughput of the entire system, it is not possible to obtain the same effect of improvement in reception quality characteristics as in the first mapping method, but it is possible to reduce the information amount to notify the mobile terminal apparatus 10 of the group band to which the data is mapped as compared with the first mapping method.

The invention is specifically described using the above-mentioned Embodiment, but it is obvious to a person skilled in the art that the invention is not limited to the Embodiment described in the Specification. The invention is capable of being carried into practice as modified and changed aspects without departing from the subject matter and scope of the invention defined by the description of the scope of claims. Accordingly, the description in the Specification is intended to be an illustrative explanation and does not have any restrictive meaning on the invention.

The present application is based on Japanese Patent Application No. 2009-002061 filed on Jan. 7, 2009, entire content of which is expressly incorporated by reference herein.

The invention claimed is:
1. A base station apparatus comprising:
a processor coupled to a memory, the processor having a mapping section configured to map transmission data for each user to resource blocks of at least one of a plurality of group bands configured by dividing a system band; and
a transmitter configured to transmit the transmission data mapped by the mapping section to a mobile terminal apparatus on a downlink, wherein
the mapping section maps the transmission data by selectively using a first mapping method or a second mapping method,
the first mapping method maps the transmission data for each user to the at least one of the plurality of group bands based on reception quality information from the mobile terminal apparatus or a throughput amount in an entire system, and
the second mapping method maps the transmission data for each user based on a mapping pattern corresponding to a combination of the plurality of group bands that is determined based on the reception quality information from the mobile terminal apparatus or the throughput amount in the entire system before the transmission data is mapped.

2. The base station apparatus according to claim 1, wherein the mapping section maps the transmission data for each user to a different group band at transmission time intervals.

3. The base station apparatus according to claim 2, the processor further having:
   a mapping information notifying section configured to notify the mobile terminal apparatus of mapping information including the group band to which the transmission data for each user is mapped by the mapping section.

4. The base station apparatus according to claim 2, wherein the mapping section shifts the transmission data for each user to an adjacent group band to map at transmission time intervals.

5. The base station apparatus according to claim 4, the processor further having:
   a mapping information notifying section configured to notify the mobile terminal apparatus of mapping information including the group band to which the transmission data for each user is mapped by the mapping section.

6. The base station apparatus according to claim 1, the processor further having:
   a mapping information notifying section configured to notify the mobile terminal apparatus of mapping information including the group band to which the transmission data for each user is mapped by the mapping section.

7. The base station apparatus according to claim 6, wherein the mapping information notifying section notifies of the mapping information at starting transmission of the transmission data for each user.

8. The base station apparatus according to claim 7, wherein the mapping information notifying section notifies of the mapping information using a broadcast channel signal.

9. The base station apparatus according to claim 6, wherein the mapping information notifying section notifies of the mapping information at transmission time intervals.

10. The base station apparatus according to claim 9, wherein the mapping information notifying section notifies of the mapping information using a control signal.

11. The base station apparatus according to claim 6, wherein the mapping information notifying section notifies of the mapping information corresponding to instructions from an upper station apparatus.

12. The base station apparatus according to claim 11, wherein the mapping information notifying section notifies of the mapping information using a broadcast channel signal.

13. An information transmission method comprising:
   a mapping step of mapping transmission data for each user to resource blocks of at least one of a plurality of group bands configured by dividing a system band; and
   a transmitting step of transmitting the mapped transmission data to a mobile terminal apparatus on a downlink, wherein
   in the mapping step, the transmission data is mapped by selectively using a first mapping method or a second mapping method,
   the first mapping method maps the transmission data for each user to the at least one of the plurality of group bands based on reception quality information from the mobile terminal apparatus or a throughput amount in an entire system, and
   the second mapping method maps the transmission data for each user based on a mapping pattern corresponding to a combination of the plurality of group bands that is determined based on the reception quality information from the mobile terminal apparatus or the throughput amount in the entire system before the transmission data is mapped.

* * * * *